L. H. HOUSTON.
TWINE DISPENSING DEVICE.
APPLICATION FILED OCT. 12, 1909.
956,640.
Patented May 3, 1910.
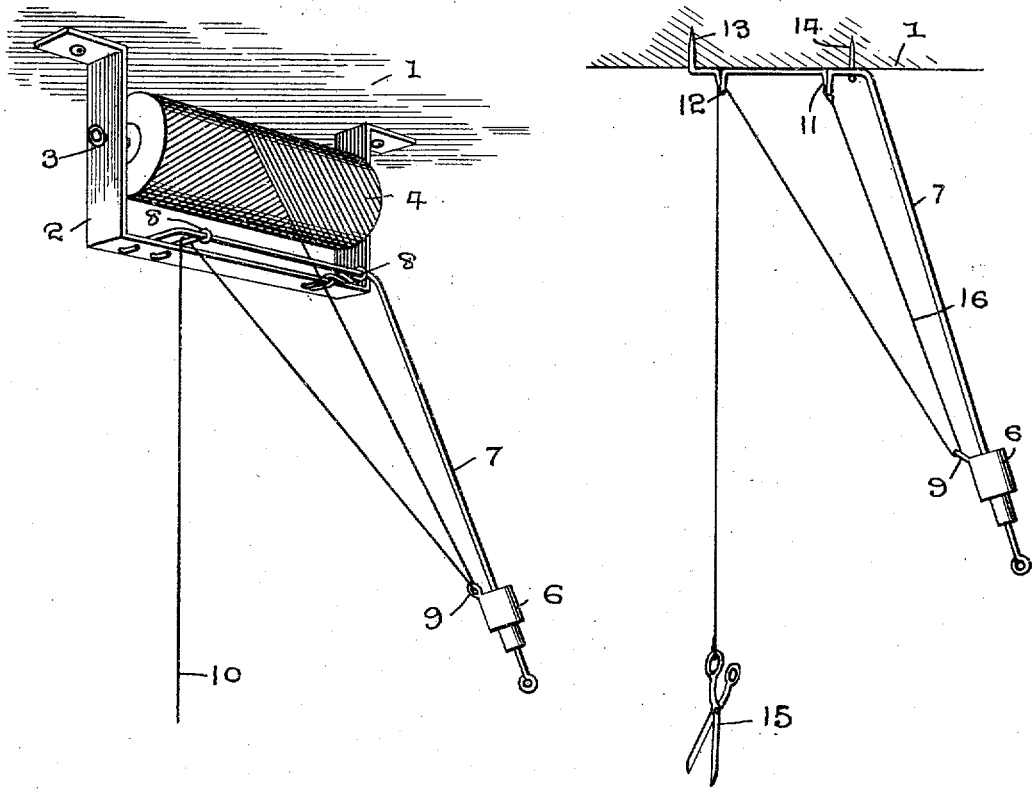
Fig. 1.   Fig. 2.
WITNESSES:
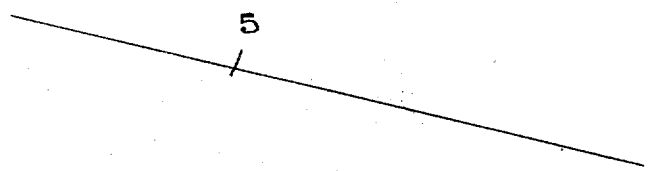
INVENTOR
L. H. Houston
BY
W. J. FitzGerald
Attorney

UNITED STATES PATENT OFFICE.

LEWIS HAMTON HOUSTON, OF PARRAL, WEST VIRGINIA.

TWINE-DISPENSING DEVICE.

956,640.  Specification of Letters Patent.  Patented May 3, 1910.

Application filed October 12, 1909. Serial No. 522,279.

*To all whom it may concern:*

Be it known that I, LEWIS HAMTON HOUSTON, a citizen of the United States, residing at Parral, in the county of Fayette and State of West Virginia, have invented certain new and useful Improvements in Twine-Dispensing Devices; and I do hereby declare the following to be a full, clear, and exact description of the invention, such as will enable others skilled in the art to which it appertains to make and use the same.

My invention relates to new and useful improvements in twine dispensing devices and more particularly to that class adapted to be used in stores or other places where balls of twine are used for tying packages and my object is to provide means for attaching the ball or roll of twine to the ceiling or other convenient point above the counter.

A further object is to provide means for elevating the loose end of the twine to a distance above the counter when not in use and a further object is to utilize the weight for elevating the end of the twine to suspend scissors or similar objects in convenient reach above the counter.

Other objects and advantages will be hereinafter referred to and more particularly pointed out in the claim.

In the accompanying drawings forming part of this application, Figure 1 is a perspective view showing the manner of suspending twine above a counter, and, Fig. 2 is an elevation showing the manner of suspending a pair of scissors above the counter.

Referring to the drawings in which similar reference numerals designate corresponding parts throughout the several views, 1 indicates the ceiling which may be constructed in the usual or any preferred manner, to which is attached a frame 2, the end portions of said frame having a shaft 3 extending horizontally therethrough, upon which is rotatably mounted a spool of twine 4, thus disposing the roll of twine above the counter 5 and out of the road, although the loose end of the twine will always be in convenient reach when it is desired to use the same for tying purposes.

In order to retain the free end of the twine a distance above the counter, I provide a weight 6, which is slidably mounted upon a rod 7, the upper end of the rod being extended substantially at right angles to the remaining portion thereof and entered through brackets 8 carried by the horizontal portion of the frame 2, the upper free end of the rod being also secured to said frame, thereby holding the rod substantially rigid.

The upper edge of the weight 6 is provided with an eye 9, through which the twine is extended, the free end of the twine being then carried upwardly from the eye and extended over one of the brackets 8, so that when a downward pull is given to the free end 10 of the twine, the weight 6 will be moved upwardly on the rod 7 and held in this position so long as the twine is being used, but when the free end of the twine is released, the weight 6 will immediately descend and carry the free end 10 a distance above the counter 5, thus supporting the end of the twine out of the way of articles being placed upon the counter and at the same time retaining the same in position to be readily grasped when the twine is to be used.

In Fig. 2 of the drawings I have shown the application of the weight for holding scissors or like articles in convenient reach and at the same time suspended above the counter and in this construction, the angular portion of the rod 7 is formed into eyes 11 and 12, the free end of the angular extension being formed into a prong 13, which enters the ceiling 1 and serves as an anchor for that portion thereof, a steeple 14 being introduced around the angular or horizontal portion of the rod 7 adjacent its connection with the descending portion of the rod, said steeple also taking into the ceiling, the prong and steeple securely anchoring the rod to the ceiling, while the prong will prevent swinging movement of the depending portion of the rod. In order to suspend the scissors 15, the end of a cord 16 is secured to the eye 11, thence extended downwardly through the eye 9 of the weight 6, upwardly through the eye 12 and is secured at its opposite end to the scissors. By this construction it will be readily seen that when it is desired to use the scissors, a downward pull thereon will elevate the weight 6 on the rod 7, the cord 16 being of sufficient length to permit the scissors to be moved into a position immediately over the counter and when the scissors are released, the weight 6 will immediately descend and elevate the scissors to the proper position. It will thus be seen that I have provided a very convenient means for suspending various objects above a counter and although I have specified the main purposes for which the device is to be used, yet it will be readily understood that it can be used for various other purposes and it will likewise be seen that the device can be very cheaply constructed and readily applied to use. As the weight 6 descends with some force, a buffer 17 is attached to the rods 7 at a point above the lower end thereof, against which the weight 6 is adapted to strike when descending on the rod, thus cushioning the blow of the weight and at the same time serving as a stop against further descent.

What I claim is:

A device of the character described, comprising a supporting frame adapted to carry a roll of twine, brackets removably secured to the lower portion of said frame and having eyes on the free ends thereof, a rod having a horizontally bent portion extending through and carried by the eyes on said brackets, the free end of said horizontal portion being bent at right angles thereto and secured to said frame and said rod proper inclined downwardly at substantially an obtuse angle to the vertical plane of said frame, and a weight slidably mounted on said inclined rod with means thereon for engaging the twine, the portion of one of said brackets between the horizontal portion of said rod and the frame forming a guide for said twine.

In testimony whereof I have signed my name to this specification in the presence of two subscribing witnesses.

LEWIS HAMTON HOUSTON.

Witnesses:
ELBERT S. DUPUY,
W. S. HARDING.